E. L. KELLEY.
FISH TROUGH.
APPLICATION FILED AUG. 1, 1916.

1,207,561.

Patented Dec. 5, 1916.

Witnesses
J. H. Crawford
J. Wilcox

Inventor
E. L. Kelley,
By Victor J. Evans
Attorney

UNITED STATES PATENT OFFICE.

EUGENE L. KELLEY, OF McKINLEY, MAINE.

FISH-TROUGH.

1,207,561.

Specification of Letters Patent.

Patented Dec. 5, 1916.

Application filed August 1, 1916. Serial No. 112,567.

*To all whom it may concern:*

Be it known that I, EUGENE L. KELLEY, a citizen of the United States, residing at McKinley, in the county of Hancock and State of Maine, have invented new and useful Improvements in Fish-Troughs, of which the following is a specification.

This invention relates to fish troughs and it consists in the novel features hereinafter described and claimed.

An object of the invention is to provide a fish trough of simple and durable structure into which the fish may be deposited, the trough being so constructed that the fish will be compelled to move through the same head first so that when they make their exit from the trough they will all be head forward and consequently are in position to be presented to knives for the purpose of beheading them. With this object in view the trough comprises a foraminous runway the body portion of which is positioned approximately horizontal and an end section of which is disposed at an angle with relation to a horizontal. The said runway may be inclosed in a casing or partially inclosed and in the event that the runway is located in a casing pipes are led through the bottom of the casing to admit water to the horizontal portion of the runway whereby the movement of the fish through the runway may be facilitated. A nozzle may also be employed for throwing water into the runway from above to assist in the movement of the fish.

In practice the fish are cast or thrown from an elevator or other suitable means into the inclined portion of the runway and inasmuch as the run is foraminous the fins and tails of the fish will catch in the openings of the runway in the event that the fish attempt to move through the same tail first, consequently the fish are compelled to turn and pass through the runway head first. The introduction of the water into the runway at several points along the bottom thereof renders its impossible for the fish to crowd in the runway and dam the same and prevent all portions of the runway from having a sufficient quantity of water to facilitate their movement.

Figure 1:
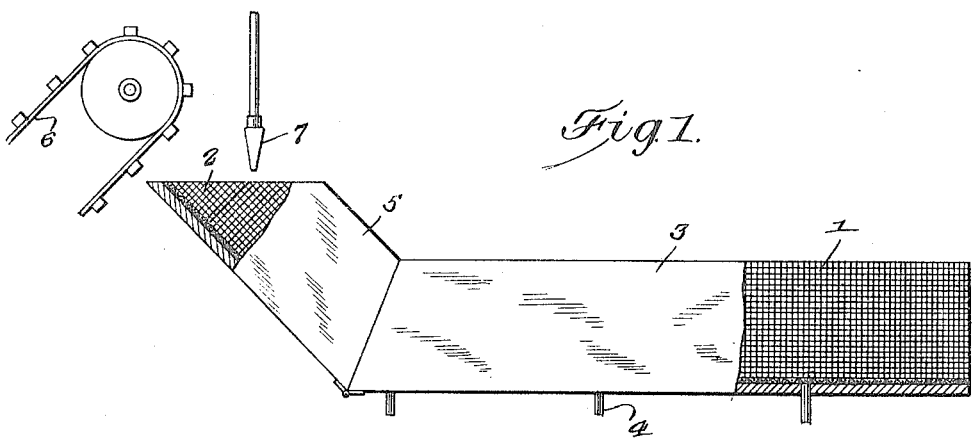
Figure 2:
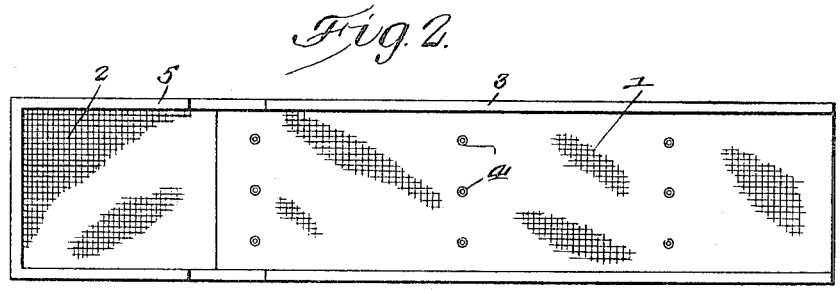
Figure 3:
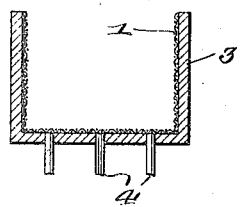

In the accompanying drawing:—Figure 1 is a side elevation of the trough with parts broken away. Fig. 2 is a top plan view of the same; Fig. 3 is a transverse sectional view of the same.

The fish trough comprises a foraminous runway 1 preferably formed from woven wire, the said runway having a horizontal body portion and an inclined receiving section 2. A casing 3 of wood or other suitable material, may partially or completely inclose the body portion of the said runway and pipes 4 lead through the bottom of the said casing and are adapted to discharge water into the runway 1. The casing section 5 is hingedly connected with one end of the casing 3 and may partially inclose the section 2 of the runway.

An elevator 6 may be positioned adjacent the section 2 and may be used for elevating and depositing the fish into the said section. A nozzle 7 is located adjacent the trough and may be connected by means of a flexible hose with any suitable source of water supply. The operator retains the said nozzle in his hand and may direct a stream of water from the same into the upper portion of the runway.

The fish are deposited or cast upon the inclined section 2 of the runway and inasmuch as the said section is provided with numerous openings should the fish attempt to pass along the section tail first their fins and tails will catch in the openings and the fish will be compelled to turn so that they will pass along the section 2 head first and enter the body of the runway in similar position. By introduction of water into the body of the runway through the pipes 4 the fish are prevented from crowding in the runway and sufficient water is supplied to enable them to pass through the body of the runway without damming or choking the same. While the fish are passing through the runway the operator may discharge a stream of water upon them or among them from the nozzle 7 to cause the fish to move promptly and freely along the runway. As the fish emerge from the end of the runway they will be head first and consequently they will be in position to be presented to a cutting machine for the purpose of beheading them.

From the foregoing description taken in conjunction with the accompanying drawing it will be seen that a fish trough of simple and durable structure is provided and that the same may be easily and conveniently used for presenting the fish in proper position to a cutting machine.

Having described the invention what is claimed is:—

A fish trough comprising a runway of foraminous material having a body portion adapted to be positioned horizontally and an end section inclined with relation to the body portion, a casing receiving the body portion of the runway and means for introducing water into the horizontal portion of the runway through the casing at different points along the same.

In testimony whereof I affix my signature.

EUGENE L. KELLEY.

Copies of this patent may be obtained for five cents each, by addressing the "Commissioner of Patents, Washington, D. C."